United States Patent [19]

Nakai et al.

[11] Patent Number: 4,829,512
[45] Date of Patent: May 9, 1989

[54] LOOP-BACK CONTROL APPARATUS FOR A LOOP NETWORK HAVING DUPLICATE OPTICAL FIBER TRANSMISSION LINES

[75] Inventors: Syoichiro Nakai; Norio Yoshida, both of Tokyo, Japan

[73] Assignee: NEC Corporation, Tokyo, Japan

[21] Appl. No.: 89,457

[22] Filed: Aug. 26, 1987

[30] Foreign Application Priority Data

Aug. 26, 1986 [JP] Japan ................................ 61-201043

[51] Int. Cl.[4] .............................................. H04J 3/02
[52] U.S. Cl. ..................................................... 370/16
[58] Field of Search ....................... 370/15, 16, 88, 87; 340/825.05; 455/601, 606, 9; 379/4, 5; 371/8, 11, 22

[56] References Cited

U.S. PATENT DOCUMENTS 3,859,468  1/1975  Smith et al. ............................ 370/88
4,710,915  12/1987  Kitahara et al. ....................... 370/16

OTHER PUBLICATIONS

Topics in Applied Physics, vol. 39, "Semiconductor Devices for Optical Communication", P. W. Shumar, et al., Springer-Verlag, New York, 1980.

"An Experiment on High-Speed Optical Time-Division Switching", Syuji Suzuki, et al., IEEE Journal of Lightwave Technology, vol. LT-4, No. 7, July 1986.

Primary Examiner—Douglas W. Olms
Assistant Examiner—Min Jung
Attorney, Agent, or Firm—Sughrue, Mion, Zinn, Macpeak & Seas

[57] ABSTRACT

A loop-back control apparatus for use in an optical fiber transmission system, wherein it is possible to compensate for faults in opto-electrical and electro-optical converters contained in the optical fiber transmission system. An electrical switch, an optical switch, and duplicate access controllers are provided, the electrical and optical switches being controlled by a control signal generator to enable selection from among the various electro-optical and opto-electrical converters in the event of fault in one of those devices.

4 Claims, 6 Drawing Sheets

| KINDS OF NODES | FIRST CONTROL SIGNAL $C_1$ | | | | | SECOND CONTROL SIGNAL $C_2$ |
|---|---|---|---|---|---|---|
| | $C_{11}$ | $C_{12}$ | $C_{13}$ | $C_{14}$ | $C_{15}$ | |
| BODY | 1 | 1 | 0 | 0 | 0 | 0 |
| HEAD | 1 | 0 | 1 | 1 | 1 | 0 |
| QUASI HEAD | 1 | 0 | 1 | 1 | 0 | 1 |
| TAIL | 1 | 0 | 1 | 0 | 1 | 0 |
| QUASI TAIL | 1 | 0 | 1 | 0 | 0 | 1 |

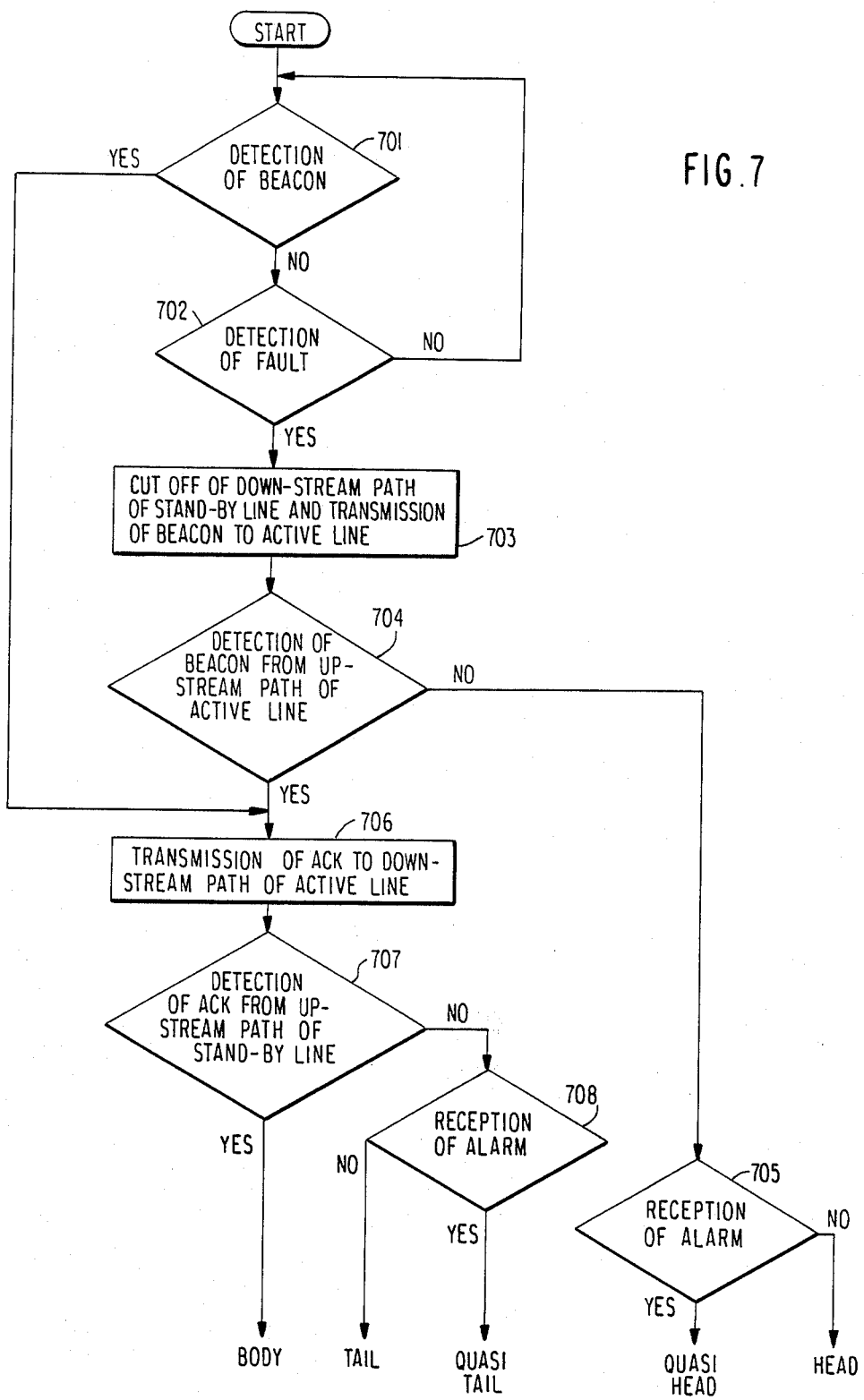

4,829,512

LOOP-BACK CONTROL APPARATUS FOR A LOOP NETWORK HAVING DUPLICATE OPTICAL FIBER TRANSMISSION LINES

BACKGROUND OF THE INVENTION

The present invention relates to a loop-back control apparatus for a loop network having duplicate optical fiber transmission lines.

A loop network needs control for restoration of communications by loo-back control of duplicate transmission lines in order to avoid the adverse effect of a cut-off of the transmission line or any other fault.

In the prior art, loop control is achieved with a loop-back control apparatus provided in each of the communications nodes constituting a loop network. The prior art loop-back apparatus, however, has the problem that, if a fault occurs in the electro-optic (E/O) converter used therein under the loop-back state, signal relay can be accomplished no longer.

SUMMARY OF THE INVENTION

An object of the present invention is to provide a loop-back control apparatus free from the aforementioned problem.

According to the invention, there is provided a loop-back control apparatus for a duplicated loop network having first and second optical fiber transmission lines. First and second opto-electrical (O/E) converters convert received optical signals of the first and second optical fibers into first and second electrical signals, respectively. First and second detectors detect any fault on the first and second optical fibers and generate first and second monitor signals, respectively. An electrical switch is responsive to a first switching control signal to perform a switching operation between the first and second electrical signals. First and second electro-optic (E/O) converters convert first and second switched electrical signals from the electrical switch into first and second transmitted optical signals and detect any fault in themselves to generate alarm signals. An optical switch is responsive to a second switching control signal to perform a switching operation between said first and second transmitted optical signals from the first and second E/O converters and supplies the switched optical signals to the first and second optical fibers. A control signal generator is responsive to the first and second monitor signals and the alarm signals to generate the first and second switching control signals.

BRIEF DESCRIPTION OF THE DRAWINGS

The above and other objects, features and advantages of the present invention will become apparent from the following detailed description when taken with the accompanying drawings in which:

FIG. 7 is a flow chart illustrating operation of the invention; and

DETAILED DESCRIPTION OF THE PREFERRED EMBODIMENT

First, to facilitate understanding of the present invention, a loop network to which the invention is applicable and a conventional loop-back control apparatus will be described with reference to FIGS. 1 and 2.

Figure 1:
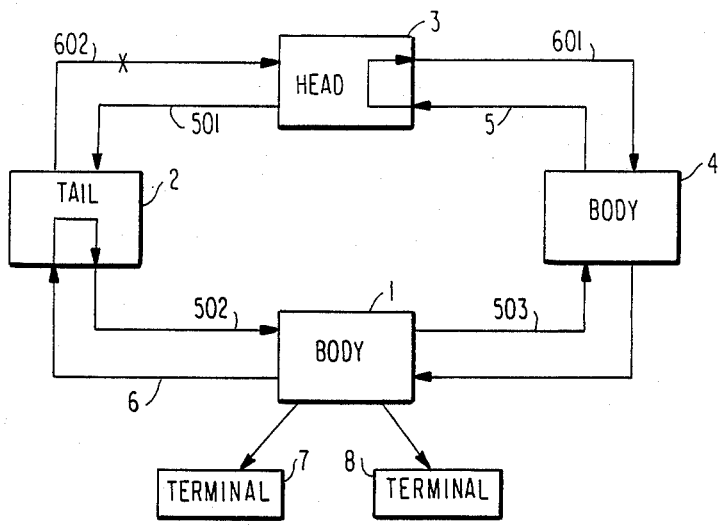
FIG. 1 is a block diagram illustrating a loop network to which the apparatus according to the invention is applicable.

A loop network permitting loop-back control, as illustrated in FIG. 1, comprises duplicate optical fiber transmission lines 5 and 6 and a plurality of communications nodes 1 to 4, connected to these transmission lines. Each node has data terminals 7 and 8, and controls the transmission and reception of signals between each data terminal and the transmission line 5 or 6 to achieve communication among the nodes. In such a structure, if the transmission lineis cut off in the position marked with "x", the nodes 2 and 3 adjacent to the position of fault perform loop-back control to reconstruct a transmission line as illustrated. Communication between each of these nodes is thereby enabled again.

Figure 2:
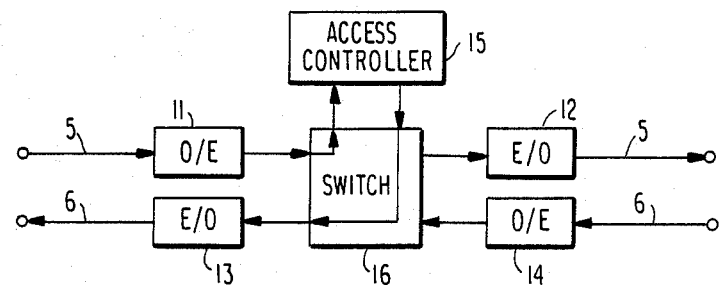
FIG. 2 is a block diagram of a conventional loop-back control apparatus.

FIG. 2 is a functional block diagram of a conventional loop-back control apparatus. Referring to the figure, the apparatus comprises O/E converters 11 and 14 and E/O converters 12 and 13, and an electrical switch 16 for controlling the exchange of electrical signals between the converters 11–14. An access controller 15 for controlling the transmission and reception of signals between the data terminals 7 and 8 and the transmission lines 5 and 6 is connected to the transmission lines via the electrical switch 16.

While FIG. 2 illustrates, as a typical instance, the switching state of the electrical switch 16. When a signal on the transmission line 5 is to be returned to the transmission line 6, it also is possible to return a signal on the transmission line 6 to the transmission line 5 by altering the connection of the switch 16.

In the prior art apparatus shown in FIG. 2, however, if any fault occurs in the E/O converter 13 under the loop-back state,signal relaying will no longer be possible.

Figure 3:
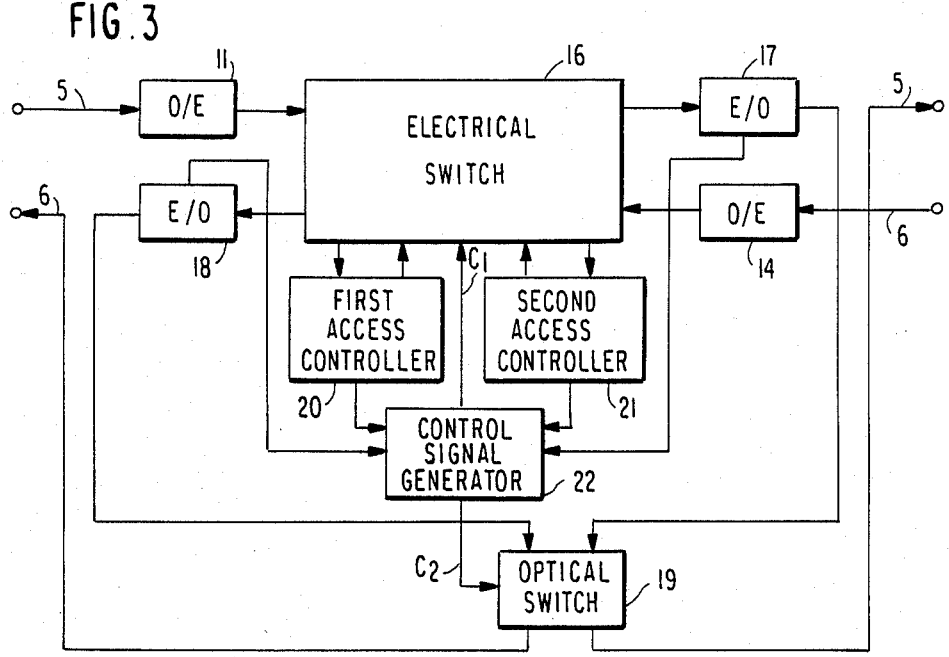
FIG. 3 is a block diagram illustrating one preferred embodiment of the invention.

FIG. 3 is a block diagram illustrating one preferred embodiment of the invention. Referring to FIG. 3, O/E converters 11 and 14 convert received optical signals on transmission lines 5 and 6, one in current use and the other standing by, and supply them to an electrical switch 16. The switch 16 performs a switching operation in response to a control signal C1 from a control signal generator 22 (this switching operation will be described in further detail below with reference to FIGS. 8 to 12).

Access controllers 20 and 21 supply electrical signals from the switch 16 to the data terminal shown in FIG. 1 or data from the data terminal to the switch 16. These access controllers 20 and 21 also detect any fault, such as a cut-off, of the transmission line 5 or 6 and a signal for loop-back, known as a beacon. The detection signals are supplied as monitor signals to the control signal generator 22 consisting of a microcomputer.

Meanwhile, signals from the electrical switch 16 are fed to E/O converters 17 and 18, where they are again converted into optical signals to be supplied to the transmission lines 5 and 6. The E/O converters 17 and 18 are so structured as to be able to monitor their own functions and, if any fault in E/O conversion is detected, supply the detection signals to the control signal generator 22 as alarm signals. Whereas the laser driver illustrated in FIG. 5.20 of Topics in Applied Physics, Vol. 39, Semiconductor Devices for Optical Communication, 1980, p. 184, can be used for such E/O converters, the driver of FIG. 5.20 should desirably have, in order to be able to supply an abnormality detection signal, an additional comparator for comparing an "out monitor" signal and a prescribed reference value. An optical switch 19 switches the transmitted optical signals from the E/O converters 17 and 18 in response to a control signal C2. For details on the optical switch 19, reference may be made to "An Experiment on High-Speed Optical Time-Division Switching" in IEEE Journal of Lightwave Technology, Vol. LT-4, No. 7, July 1986, pp. 894–899. The control signal generator 22, in response to the alarm signals from the E/O converters 17 and 18 and the monitor signals from the access controllers 20 and 21, generates the control signal C1 for switching the switch 16 and the control signal C2 for switching the optical switch 19.

Figures 4, 5:
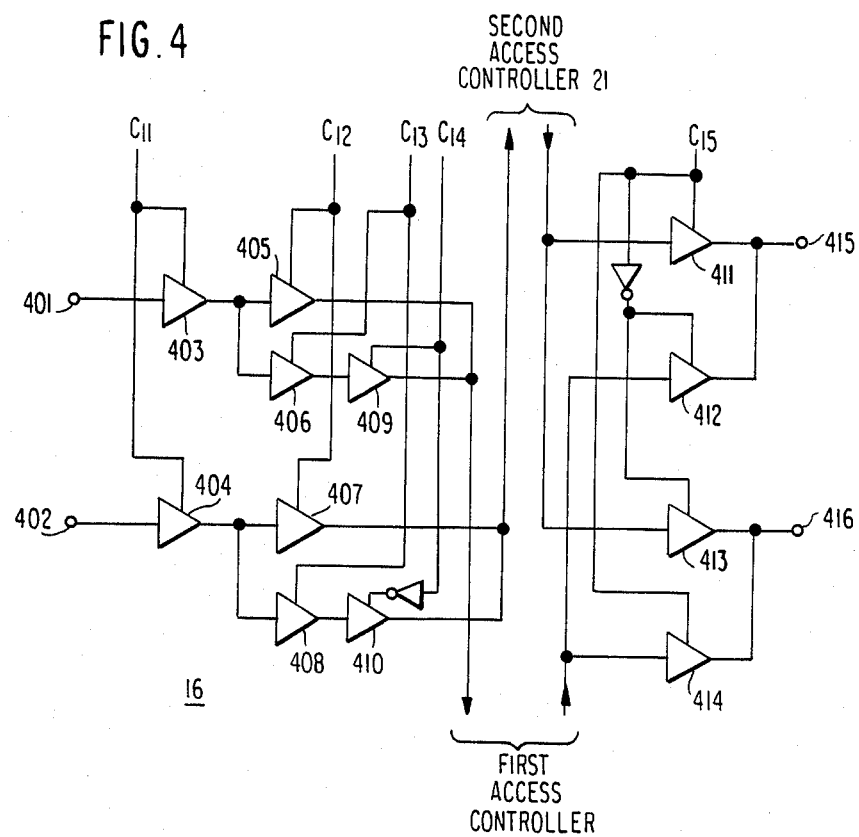
FIG. 4 is a diagram showing a structure of the electrical switch.
FIG. 5 is a table of control signal states generated in the present invention.

FIG. 4 is a circuit diagram illustrating the specific structure of the electrical switch 16, and FIG. 5 is a table showing details of the switching control signals C1 and C2. Referring to FIG. 4, the switch 16 has input terminals 401 and 402 for receiving the electrical signals from the O/E converters 11 and 14. Twelve three-state gates 403 to 414 switch the input signals in response to the control signal C1 which comprises control signals C11 to C15 supplied from the control signal generator 22. For instance, when the control signals C11 to C15 are "11000", the gates 403, 404, 405, 407, 412 and 413 are turned ON, so that the signals from the input terminals 401 and 402 are supplied to the access controllers 20 and 21, respectively. The signals from the access controllers 20 and 21 are then supplied to output terminals 415 and 416 via the gates 412 and 413, respectively. Kinds of nodes of FIG. 5 will be described later.

Figure 6:
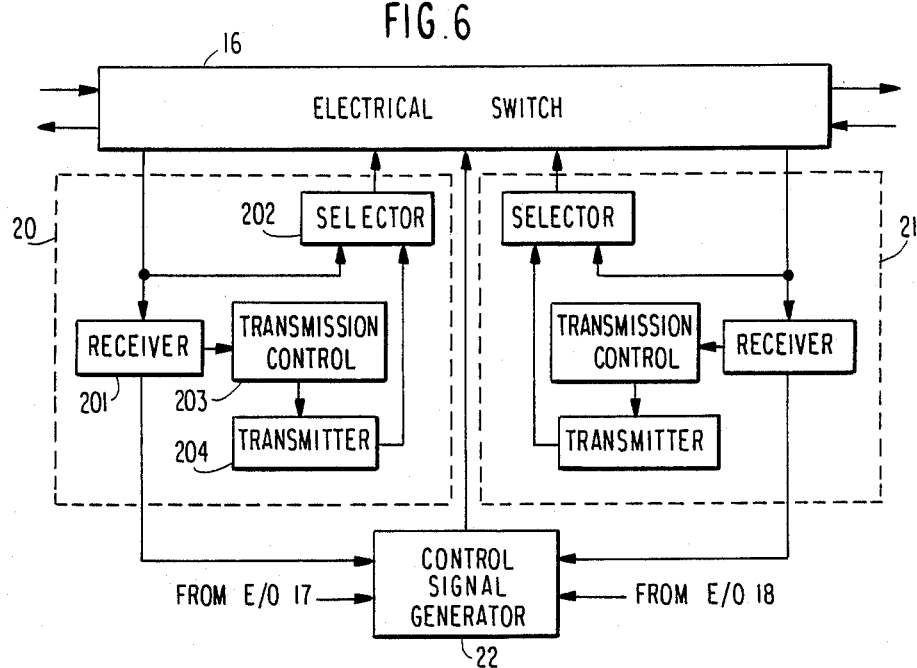
FIG. 6 is a diagram showing a structure of the access controller.

FIG. 6 illustrates the specific structure of the access controllers 20 and 21 together with the switch 16 and the control signal generator 22. Since the access controller 21 has the same structure as the access controller 20 in the figure, the following description will refer only to the access controller 20 as representing the other access controller 21 as well. The access controller 20 has a receiver 201 for receiving signals from the switch 16 and supplying them to the data terminal. The receiver also has a function to detect a cut-off of any transmission line and supplies a monitor signal indicating the detection to the control signal generator 22. A transmission controller 203 monitors received signals and determines whether or not the lines are available for transmission by its own communications node. A transmitter 204 transmits signals from its own data terminal in response to a determination signal from the transmission controller 203. A selector 202 selectively supplies receive and transmit signals to the switch 16. No further explanation will be made of these structural elements, as they are well known as the constituents of nodes of a local area network or the like.

Figure 8:
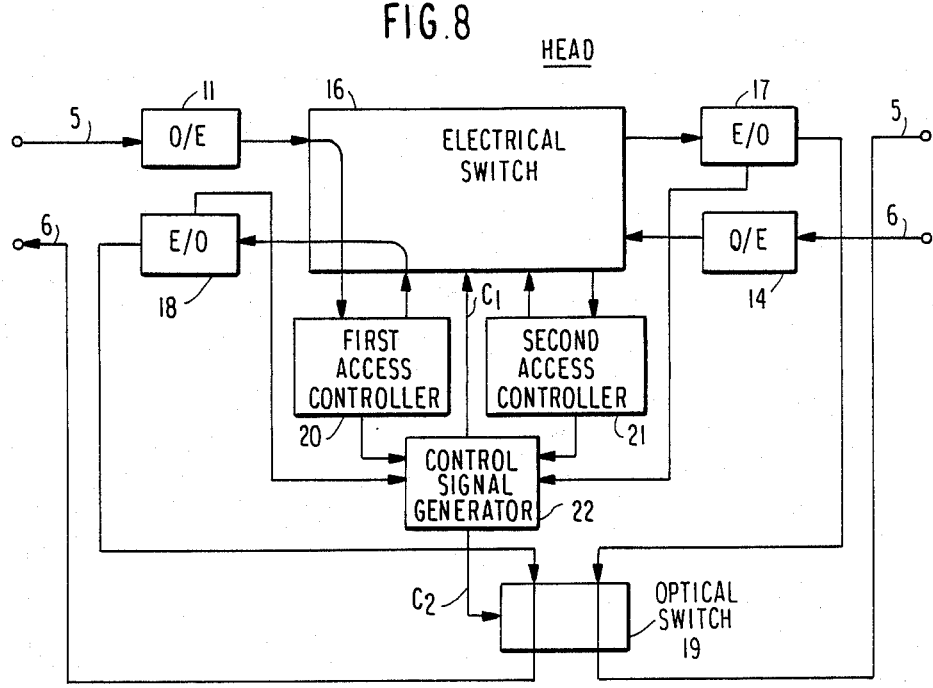
FIGS. 8 to 12 are diagrams for explaining loop-back control according to the invention.

Now will be described the operation of the control signal generator 22 with reference to the flow chart of FIG. 7 and FIG. 1. Referring to FIG. 1, it is supposed that the transmission lines 5 and 6 are the stand-by line and the active line, respectively, and the latter is cut off in the position marked with "x" shown in FIG. 1. First, when its own station is the node 3 downstream from the cut-off position, the generator 22 of the node 3 receives at Step 702 of FIG. 7 from the receiver 201 (FIG. 6) a monitor signal indicating a fault on the transmission line 602, it intercepts an upstream path 501 of the stand-by line, and at the same time supplies, via the transmitter 204, an active path 601 with a fault indicating signal BCN as the beacon (Step 703). Next, the generator 22 monitors whether or not the beacon BCN from the node 2 on the upstream path 602 of the active line is received within a prescribed period of time and, if not, outputs a time-out signal (Step 704). If, at this time, no alarm signals are received from the E/O converters 17 and 18 (FIG. 3), the generator 22 determines its own node to be the head, i.e. the node immediately upstream from the position of fault, and outputs the control signals C1 and C2 corresponding to the head, as shown in FIG. 5. The switches 16 and 19 switch the inputs and outputs as shown in FIG. 8 in accordance with the control signals C1 and C2 shown in FIG. 5. The signal on the transmission line 5 is thereby looped back to the transmission line 6. The optical switch 19 directly outputs the input when the control signal C2 is "0".

Figure 9:
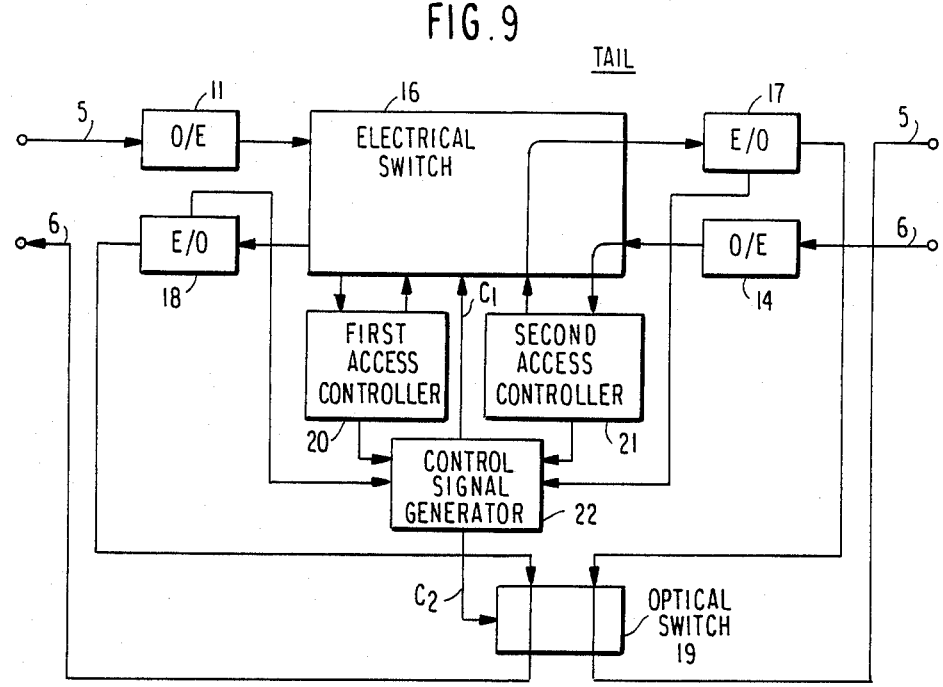

Next, when its own station is the node 2, the generator 22, upon receiving a beacon from the node 3 (Step 701), outputs an ACK signal on the downstream path 502 of the stand-by line (Step 706). After that, the generator 22 monitors an ACK signal from an upstream node 3 via the upstream path 501 of the stand-by line. In this case, since the stand-by path 501 is already intercepted in the process of the node 3 being determined as the head, no ACK signal is received from the node 3 within a prescribed period of time, and a time-out signal is outputted (Step 707). If no alarm signals have been received from the E/O converters 17 and 18 by this time (Step 708), the generator 22 determines its own station to be the tail, i.e. the node immediately downstream from the position of fault, and outputs the switch control signal C1 and C2 corresponding to the tail. The switches 16 and 19, in response to the control signals C1 and C2 shown in the table of FIG. 5, connects the inputs and outputs as shown in FIG. 9. As a result, the signal on the transmission line 6 is looped back to the transmission line 5.

Figure 10:
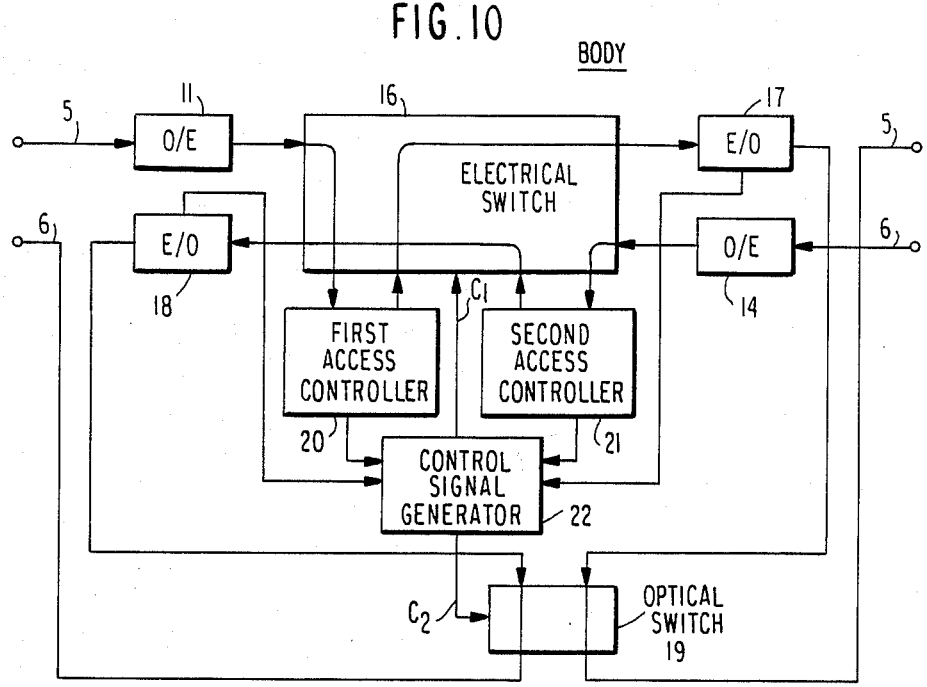

Meanwhile, when its own station is the node 1, the generator 22, receiving a beacon from the node 4, supplies an ACK signal to the downstream path 503 of the stand-by line (Steps 701 and 706). Since the node 3 has been determined as the tail, it has sent out an ACK signal. Therefore, the node 1 receives an ACK signal from the node 2 within a prescribed period of time, and the generator 22 determines its own station to be the body, i.e. the node between the tail and the head, and outputs control signals C1 and C2 corresponding to the body. The switches 16 and 19, in response to the control signals shown in FIG. 5, connect the inputs and outputs as shown in FIG. 10. As a result, the signals on the transmission lines 5 and 6 are transmitted as they are on the lines 5 and 6. No further explanation will be made of the control signal C1 as it is based on the loop-back algorithm disclosed as IEEE 802.5.

Figure 11:
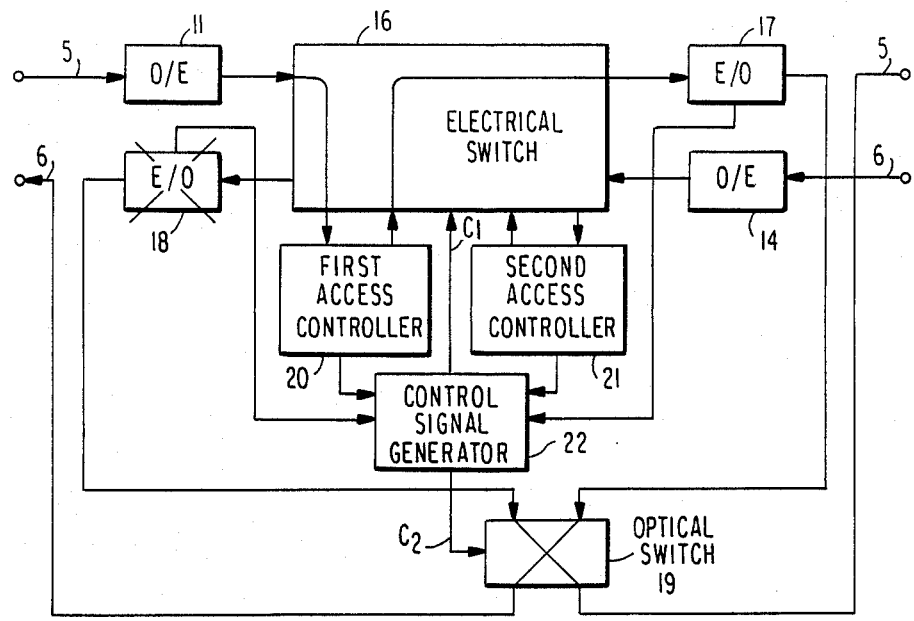
Figure 12:
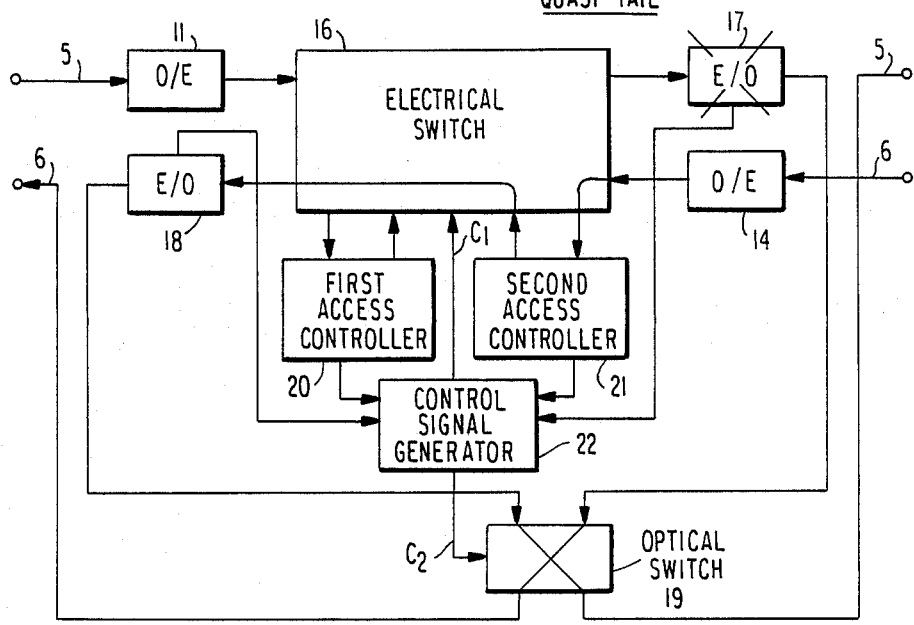

Next, when an alarm is sent out from the E/O converter 18 (Step 705) in the loop-back state illustrated in FIG. 8, the generator 22 determines its own station as the quasihead, and outputs the corresponding control signals C1 and C2 as shown in FIG. 5. Since the E/O converter 17 is used instead of the E/O converter 18 in this state as shown in FIG. 11, the switch 19 so operates as to alter its input and output connections, and retains its loop-back state.

Meanwhile, when an alarm is sent out from the E/O converter 17 in the loop-back state of FIG. 9 (Step 708), the generator 22 determines its own station to be the quasi-tail, and outputs the control signals C1 and C2 as shown in FIG. 5. In this case, too, the switch 19 so operates as to substitute the E/O converter 18 for the E/O converter 17 and retains its loop-back state.

As hitherto described, the present invention, by adding an optical switch capable of switching the outputs of two E/O converters and supplying their outputs on transmission lines, enables continuation of loop-back state, even when a fault occurs in one of the E/O converters when nodes are under loop-back state, by theuse of the other E/O converter, resulting in a greater reliability.

We claim:

1. A loop-back control apparatus for a duplicated loop network having a first optical fiber transmission line connected to a first communication node and a second optical fiber transmission line connected to a second communication node, said loop-back control apparatus comprising:

first and second opto-electrical (O/E) converter means for converting received optical signals of said first and second optical fiber transmission lines received from said first and second communication nodes into first and second electrical signals, respectively, first detector means for detecting any fault on said first optical fiber transmission line and generating a first monitor signal in response to a detection of said fault on said first optical fiber transmission line;

second detector means for detecting any fault on said second optical fiber transmission line and generating a second monitor signal in response to a detection of said fault on said second optical fiber transmission line;

electrical switch means responsive to a first switching control signal for performing a switching operation between said first and second electrical signals;

first and second electro-optic (E/O) converter means for converting first and second electrical signals from said electrical switch means into first and second optical signals and detecting any fault in themselves to generate alarm signals;

optical switching means responsive to a second switching control signal for performing a switching operation between said first and second optical signals from said first and second E/O converter means and supplying switched optical signals to said first and second optical fiber transmission lines; and control signal generator means responsive to said first and second monitor signals and said alarm signals for generating said first and second switching control signals.

2. A loop-back control apparatus as claimed in claim 1, wherein said first detector means comprises:

means for detecting a cut-off of any of said transmission lines and supplying said monitoring signal accordingly to said control signal generatormeans;

means, connected to said detection cut-off means, for determining availability of said transmission lines for transmission;

transmitter means, connected to said determining means, for transmitting signals from a data terminal to the loop-back control apparatus; and selector means for selectively supplying receive and transmit signals to said electrical switch means.

3. A loop-back control apparatus as claimed in claim 1, wherein said second detector means comprises:

means for detecting a cut-off of any of said transmission lines and supplying said monitoring signal accordingly to said control signal generator means;

means, connected to said detection cut-off means, for determining availability of said transmission lines for transmission;

transmitter means, connected to said determining means, for transmitting signals from a data terminal to the loop-back control apparatus; and selector means for selectively supplying receive and transmit signals to said electrical switch means.

4. A loop-back control apparatus as claimed in claim 1, wherein said first control signal comprises five statedetermining signals, and wherein said electrical switch means comprises a plurality of multi-state gates, responsive to said five state-determining signals, for controlling passage of signals to and from said first and second detector means.

* * * * *

UNITED STATES PATENT AND TRADEMARK OFFICE
CERTIFICATE OF CORRECTION

PATENT NO. : 4,829,512

DATED : May 9, 1989

INVENTOR(S) : NAKAI

It is certified that error appears in the above-identified patent and that said Letters Patent is hereby corrected as shown below:

Column 1, line 12, delete "loo-back" and insert --loop-back--;

Column 2, line 22, delete "lineis" and insert --line is--;

Column 5, line 16, delete "theuse" and insert --the use--;

Column 6, line 18, delete "generatormeans" and insert --generator means--;

Column 6, lines 41 and 42, delete "statedetermining" and insert --state-determining--.

Signed and Sealed this

Thirteenth Day of March, 1990

*Attest:*

JEFFREY M. SAMUELS

*Attesting Officer*  *Acting Commissioner of Patents and Trademarks*